United States Patent
Cha et al.

(10) Patent No.: US 9,237,588 B2
(45) Date of Patent: Jan. 12, 2016

(54) METHOD FOR TRANSMITTING UPLINK DATA, AND BASE STATION AND TERMINAL SUPPORTING THE SAME IN MOBILE COMMUNICATION SYSTEM

(75) Inventors: Jae Sun Cha, Daejeon (KR); Soojung Jung, Daejeon (KR); Seokki Kim, Osan-si (KR); Chul Sik Yoon, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 238 days.

(21) Appl. No.: 13/369,285

(22) Filed: Feb. 8, 2012

(65) Prior Publication Data

US 2012/0201197 A1    Aug. 9, 2012

(30) Foreign Application Priority Data

Feb. 9, 2011   (KR) .................. 10-2011-0011585

(51) Int. Cl.
*H04W 4/00* (2009.01)
*H04W 76/00* (2009.01)

(52) U.S. Cl.
CPC .................. *H04W 76/002* (2013.01)

(58) Field of Classification Search
CPC ..... H04W 60/00; H04W 60/04; H04W 60/06; H04W 68/06; H04W 68/005; H04W 76/028
USPC .................. 370/310–350, 432, 450
See application file for complete search history.

(56) References Cited

U.S. PATENT DOCUMENTS

| | | | |
|---|---|---|---|
| 2009/0034742 A1* | 2/2009 | Appenzeller et al. | 380/279 |
| 2010/0004002 A1* | 1/2010 | Hahn et al. | 455/456.1 |
| 2010/0098247 A1* | 4/2010 | Suumaki | 380/44 |
| 2010/0113070 A1* | 5/2010 | Nigam et al. | 455/458 |
| 2012/0034918 A1* | 2/2012 | Park et al. | 455/435.1 |
| 2012/0051300 A1* | 3/2012 | Cho et al. | 370/329 |

* cited by examiner

*Primary Examiner* — Ricky Ngo
*Assistant Examiner* — Wei-Po Kao
(74) *Attorney, Agent, or Firm* — Rabin & Berdo, P.C.

(57) ABSTRACT

Provided are a method for transmitting uplink data by a terminal in a mobile communication system, the method comprising: when data to be transmitted to uplink is generated in an idle mode, transmitting a ranging request message including at least one of a group identifier allocated to each terminal group to which the terminal belongs, an offline transmission indicator indicating transmission of uplink data in a state in which the terminal is not connected to a network, and uplink data, to a base station; and receiving a ranging response message confirming that the uplink data has been successfully transmitted, from the base station.

10 Claims, 5 Drawing Sheets

METHOD FOR TRANSMITTING UPLINK DATA, AND BASE STATION AND TERMINAL SUPPORTING THE SAME IN MOBILE COMMUNICATION SYSTEM

CROSS-REFERENCE TO RELATED APPLICATION

This application claims priority to and the benefit of Korean Patent Application No. 10-2011-0011585 and 10-2012-0012737 filed in the Korean Intellectual Property Office on Feb. 9, 2011 and Feb. 8, 2012, the entire contents of which are incorporated herein by reference.

BACKGROUND OF THE INVENTION (a) Field of the Invention

The present invention relates to a mobile communication system. More particularly, the present invention relates to a method for transmitting uplink data in a wideband mobile communication system.

(b) Description of the Related Art

A wideband mobile communication system is used for high speed data communication or voice communication through a computer or a terminal controlled by a user. Meanwhile, recently, demands for realizing machine-to-machine (M2M) communication performed without user intervention are on the rise. Thus, efforts are actively ongoing to support M2M communication by changing an existing wideband mobile communication system.

One of major matters to be considered in M2M communication is minimizing power consumption of terminals. To this end, a terminal (which may also be used together with an M2M terminal, hereinafter) supporting M2M communication may enter an idle mode immediately after an initial network entry to reduce power consumption. Thereafter, when there is data to be transmitted to uplink, the M2M terminal performs a network reentry procedure to transition to an active mode to thus transmit uplink data.

However, in terms of M2M communication, data transmitted by M2M terminals is data of a very small unit. Thus, if the network reentry procedure is performed every time data of a small unit is transmitted, more power may rather be consumed.

SUMMARY OF THE INVENTION

The present invention has been made in an effort to provide a method for transmitting uplink data in a wideband mobile communication system.

According to one exemplary embodiment of the present invention, there is provided a method for transmitting uplink data by a terminal in a mobile communication system, the method comprising: when data to be transmitted to uplink is generated in an idle mode, transmitting a ranging request message including at least one of a group identifier allocated to each terminal group to which the terminal belongs, an offline transmission indicator indicating transmission of uplink data in a state in which the terminal is not connected to a network, and uplink data, to a base station; and receiving a ranging response message confirming that the uplink data has been successfully transmitted, from the base station.

According to one exemplary embodiment of the present invention, there is provided a method for receiving uplink data by a base station in a mobile communication system, the method comprising: receiving a ranging request message including at least one of a group identifier allocated to each terminal group to which a terminal belongs, an offline transmission indicator indicating transmission of uplink data in a state in which the terminal is not connected to a network, and uplink data; recognizing that the terminal intends to transmit the uplink data in a state in which it is not connected to a network, through the offline transmission indicator; transferring the group identifier and the uplink data to a service providing server corresponding to the group identifier; receiving a terminal identifier specific to the terminal from the service providing server; and transmitting a ranging response message informing that the uplink data has been successfully received from the terminal by using the terminal identifier.

According to one exemplary embodiment of the present invention, there is provided a method for identifying a terminal by a service providing server in a mobile communication system, the method comprising: receiving a group identifier allocated to each terminal group to which a terminal belongs and uplink data encrypted by an encryption key corresponding to the group identifier; decrypting the uplink data by using the encryption key; obtaining a terminal identifier specific to the terminal from the decrypted uplink data; and transmitting the terminal identifier to the base station.

According to one exemplary embodiment of the present invention, there is provided a terminal used in a mobile communication system, the terminal comprising: a radio frequency (RF) unit; and a processor, wherein when data to be transmitted to uplink is generated in an idle mode, the processor transmits a ranging request message including at least one of a group identifier allocated to each terminal group to which the terminal belongs, an offline transmission indicator indicating transmission of uplink data in a state in which the terminal is not connected to a network, and uplink data, to a base station, and receives a ranging response message confirming that the uplink data has been successfully transmitted, from the base station.

DETAILED DESCRIPTION OF THE EMBODIMENTS

Figure 1:
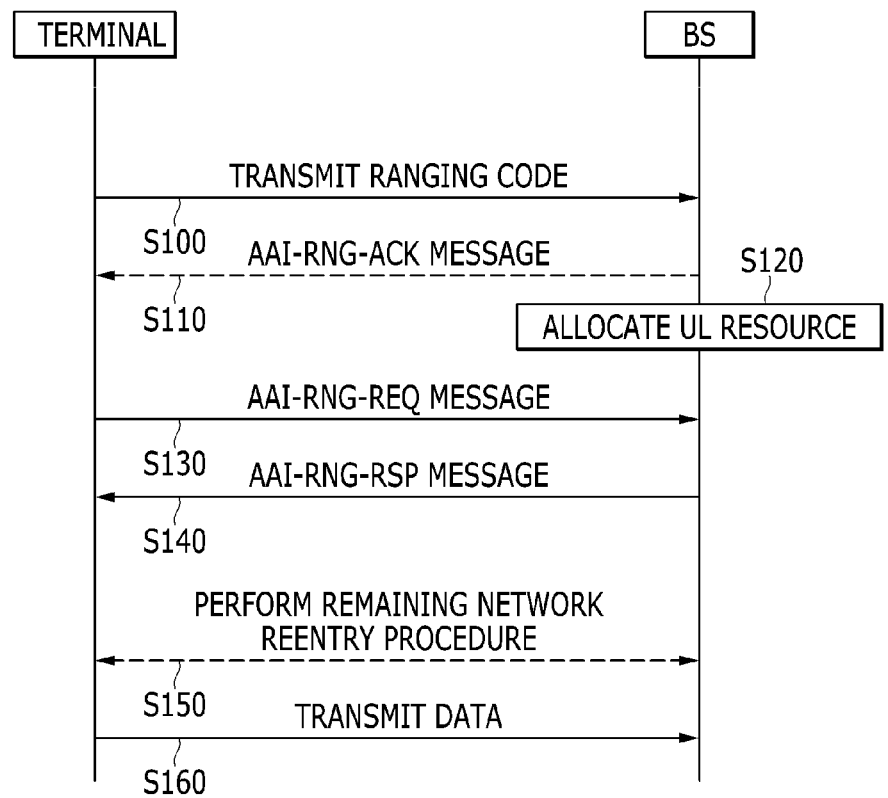
FIG. 1 is a flow chart illustrating an example of a method for transmitting uplink data by a terminal in a wideband mobile communication system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

Throughout the specification, a mobile station (MS) may refer to a terminal, a mobile terminal (MT), a subscriber station (SS), a portable subscriber station (PSS), an access terminal (AT), a user equipment (UE), or the like, and may include an entirety or a portion of functions of a terminal, an MT, an SS, a PSS, an AT, a UE, and the like.

Also, a base station (BS) may refer to a node B, an evolved node B (eNodeB), an access point (AP), a radio access station (RAS), a base transceiver station (BTS), a mobile multihop relay (MMR)-BS, and the like, and may include an entirety or a portion of functions of a node B, an eNodeB, an AP, a RAS, a BTS, an MMR-BS, and the like.

FIG. 1 is a flow chart illustrating an example of a method for transmitting uplink data by a terminal in a wideband mobile communication system. It is assumed that the terminal is in an idle mode and has data to be transmitted to uplink. Here, the terminal performs a network reetnry (or re-access) procedure and transmits uplink data.

With reference to FIG. 1, the terminal transmits a ranging code for uplink bandwidth request and uplink synchronization obtainment to a base station (BS) (S100).

Upon receiving the ranging code, the BS interprets the ranging code. When the ranging code is normally interpreted, the BS transmits a ranging acknowledgement (AAI-RNG-ACK (Advanced Air Interface-Ranging-Acknowledgement)) message to the terminal (S110) and allocates uplink (UL) resource to the terminal (S120). Here, the AAI-RNG-ACK message may be omitted according to a situation of the BS.

Meanwhile, after transmitting the ranging code, the terminal continuously checks whether or not an uplink bandwidth is allocated from the BS. When the terminal checks an uplink bandwidth allocated to the terminal itself, the terminal transmits a ranging request (AAI-RNG-REQ (Advanced Air Interface-Ranging-Request)) message to the BS through the allocated uplink bandwidth (S130). Here, the AAI-RNG-REQ message includes an individual identifier allocated to the terminal from the BS during idle mode entry. The BS may identify the terminal which has transmitted the AAI-RNG-REQ message through the individual identifier included in the AAI-RNG-REQ message.

Thereafter, the BS transmits a ranging response (AAI-RNG-RSP (Advanced Air Interface-Ranging-Response)) message to the terminal in response to the AAI-RNG-REQ message (S140). When the BS transmits the AAI-RNG-RSP message, the network reentry procedure between the BS and the terminal may be completed. Alternatively, an additional network reentry procedure may be performed between the BS and the terminal (S150).

When the network reentry procedure is completed, the terminal performs a procedure for requesting a normal uplink bandwidth from the BS and then transmits uplink data to the BS (S160).

In this manner, when the terminal in the idle mode has data to be transmitted to uplink, the terminal should perform a network reentry procedure with the BS. When the same protocol is applied to an M2M terminal, a network reentry procedure should be performed each time the M2M terminal transmits data of a small unit, wasting power of the M2M terminal.

Meanwhile, in the network reentry procedure, in order for the BS to identify a terminal, the BS should allocate an individual identifier to the terminal before the terminal enters an idle mode. In M2M communication, a great number of M2M terminals should be considered, so the length of an individual identifier allocated to the terminal which enters an idle mode is to be lengthened. The individual identifier is operated separately from a terminal-specific identifier (referred to as a 'terminal identifier', hereinafter) allocated from an upper layer, having a problem in the aspect of overhead. In addition, in order for the BS to identify a terminal through an individual identifier, a procedure for requesting a particular server within a network in which the corresponding individual identifier has been allocated, to identify the individual identifier should be additionally performed.

Hereinafter, a method for transmitting uplink data of an M2M terminal according to an embodiment of the present invention will be described. In particular, a method for transmitting uplink data by an M2M terminal in an idle mode without having to perform a network reentry procedure will be described. To this end, a method for allocating a group identifier to a terminal group including a plurality of M2M terminals, rather than allocating an individual identifier to an M2M terminal entering an idle mode, is proposed.

Figure 2:
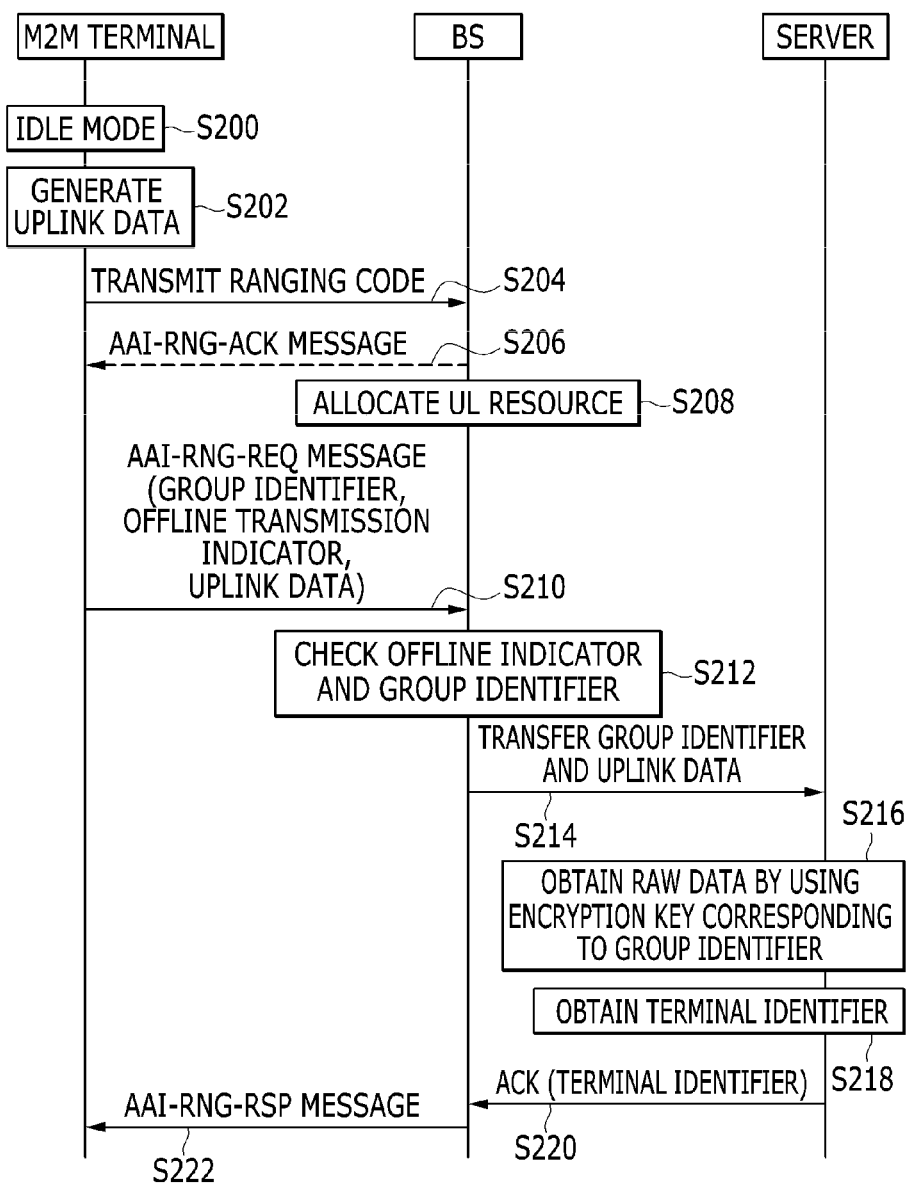
FIG. 2 is a flow chart illustrating the process of a method for transmitting uplink data by an M2M terminal in a mobile communication system according to an embodiment of the present invention.

FIG. 2 is a flow chart illustrating the process of a method for transmitting uplink data by an M2M terminal in a mobile communication system according to an embodiment of the present invention.

With reference to FIG. 2, the M2M terminal is in an idle mode (S200). When data to be transmitted to uplink is generated (S202), the M2M terminal transmits a ranging code for uplink bandwidth allocation and uplink synchronization obtainment to the BS (S204).

Upon receiving the ranging code, the BS interprets the ranging code. When the ranging code is normally interpreted, the BS transmits a ranging acknowledgement (AAI-RNG-ACK (Advanced Air Interface-Ranging-Acknowledgement)) message (S206) and allocates uplink resource to the terminal (S208). Here, AAI-RNG-ACK message may be omitted according to a situation of the BS.

Meanwhile, the M2M terminal, which has transmitted the ranging code, continuously checks whether or not uplink bandwidth is allocated. When the terminal identifies an uplink bandwidth allocated thereto, the M2M terminal transmits a ranging request (AAI-RNG-REQ (Advanced Air Interface-Ranging-Request)) message to the BS through the allocated uplink bandwidth (S210). Here, the AAI-RNG-REQ message includes a group identifier which has been allocated from the BS during idle mode entry. The group identifier is allocated to each terminal group. Here, the terminal group may be configured according to various criteria. For example, a terminal may be configured in consideration of a geographical location of a corresponding terminal, configured in consideration of a subscriber providing a service to the corresponding terminal, configured in consideration of a service provided to the corresponding terminal, or configured according to a unique identifier of the corresponding terminal. The number of terminals belonging to each terminal group may be the same or different. One terminal may belong to two or more terminal groups. In an implementation example, a group identifier may be an identifier allocated to each subscriber. Namely, a plurality of M2M terminals receiving a service from the same subscriber may be allocated the same group identifier. Here, a subscriber may refer to an entity providing a particular M2M service to one or more M2M terminals in association with a service provider. For example, when a company 'A' providing an automobile location tracking service is a subscriber, one group identifier is allocated to the company 'A'. Users who want to receive the automobile location tracking service may purchase an M2M terminal and receive the automobile location tracking service from the company 'A'. In this case, all of the M2M terminals which receive the automobile location tracking service form the company 'A' are allocated the same group identifier.

The AAI-RNG-REQ message may further include an offline transmission indicator indicating transmission of uplink data in a state in which the M2M terminal is not connected to the network, and uplink data. Here, the uplink data may be encrypted by an encryption key corresponding to a group identifier. According to an embodiment of the present invention, the terminal transmits the ranging request message by using the group identifier, the BS cannot know which of terminals has transmitted the ranging request message. Thus, in order to solve such a problem, uplink data within the ranging request message may include a unique terminal identifier allocated from an upper layer.

The BS checks the offline transmission indicator and the group identifier included in the AAI-RNG-REQ message (S212). The BS may recognize that the M2M terminal intents to transmit uplink data in a state in which the M2M terminal is not connected to a network, through the offline transmission indicator. Also, the BS may know a server from which the M2M terminal is provided with a service, through the group identifier.

The BS transfers the group identifier and the uplink data to the server within the network corresponding to the group identifier included in the AAI-RNG-REQ message (S214).

Upon receiving the uplink data from the BS, the server decrypts (or decodes) the uplink data by using an encryption key corresponding to the received group identifier and obtains raw data (S216). The server obtains the unique terminal identifier included in the raw data (S218).

Thereafter, the server transmits an acknowledgement (ACK) message with respect to the transfer of the uplink data to the BS (S220). The ACK message may include the terminal identifier of the M2M terminal included in the uplink data.

When the BS receives the terminal identifier from the server, the BS transmits a ranging response (AAI-RNG-RSP (Advanced Air Interface-Ranging-Response)) message to the M2M terminal to inform the M2M terminal that the uplink data has been normally received (S222). The AAI-RNG-RSP message may be encrypted by an encryption key corresponding to the unique terminal identifier received from the server and transmitted.

Accordingly, when the M2M terminal enters an idle mode, the M2M terminal is not required to allocate an individual identifier. Thus, a large number of M2M terminals can be supported without having to increase the size of identifiers allocated during idle mode entry. Also, when the M2M terminal in the idle model wants to transmit data to uplink, the M2M terminal is not required to perform a network reentry procedure.

Figure 3:
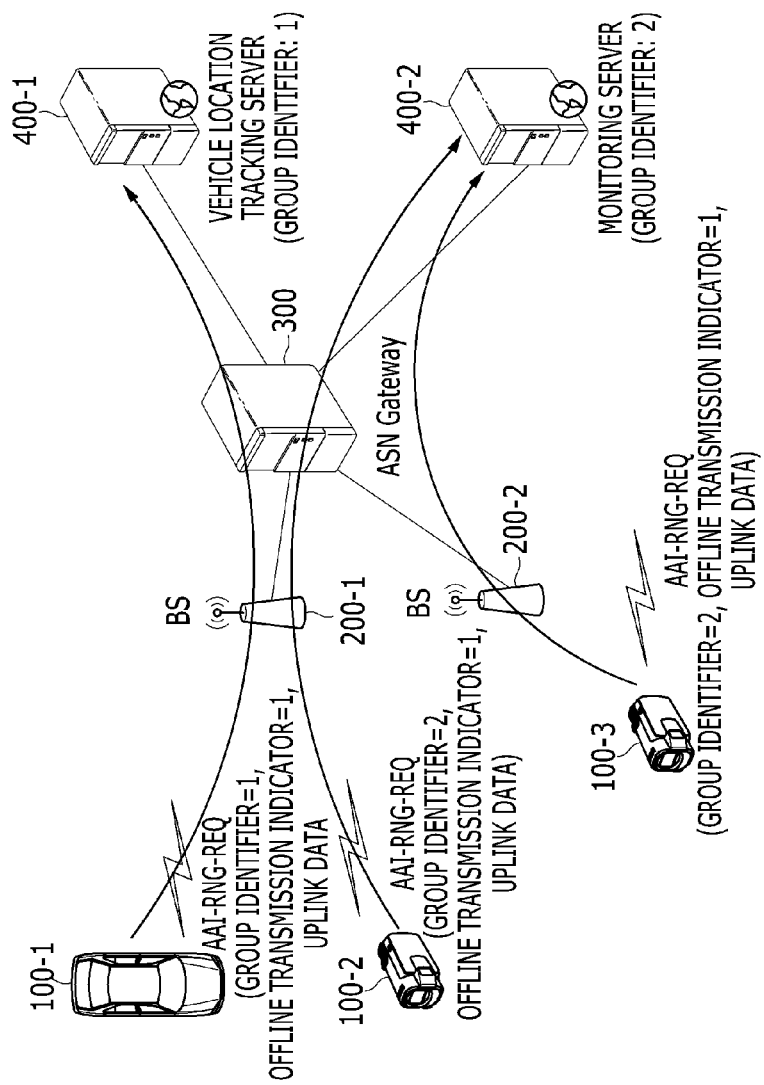
FIG. 3 is a view showing a network environment supporting an uplink data transmission procedure of an M2M terminal according to an embodiment of the present invention.

FIG. 3 is a view showing a network environment supporting an uplink data transmission procedure of an M2M terminal according to an embodiment of the present invention.

With reference to FIG. 3, a network environment supporting an uplink data transmission procedure of an M2M terminal includes one or more M2M terminals 100-1, 100-2, and 100-2, one or more base stations 200-1 and 200-2, a gateway 300, and one or more service providing servers 400-1 and 400-2.

The M2M terminal 100-1 is an M2M terminal for receiving a vehicle location tracking service, and the M2M terminals 100-2 and 100-3 are M2M terminals for receiving a monitoring service.

The M2M terminals 100-1 and 100-2 may be connected to the BS 200-1 through a radio section, and the M2M terminal 100-3 may be connected to the BS 200-2 through a radio interface.

The gateway 300 may be, for example, an access service network (ASN) gateway. Several BSs 200-1 and 200-2 may be managed by the single ASN gateway 300.

The service providing server 400-1 is a server operated by a subscriber providing a vehicle location tracking service, and the service providing server 400-2 is a server operated by a subscriber providing a monitoring service. It is illustrated that the respective service providing servers exist independently.

It is assumed that the M2M terminals 100-1, 100-2, and 100-3 are all in an idle mode and data to be transmitted to uplink is generated.

The M2M terminal 100-1 is set to have a group identifier=1 and an offline transmission indicator=1, and transmits an AAI-RNG-REQ message including uplink data to the BS 200-1.

The M2M terminal 100-2 is set to have a group identifier=2 and an offline transmission indicator=1, and transmits an AAI-RNG-REQ message including uplink data to the BS 200-1.

The M2M terminal 100-3 is set to have a group identifier=2 and an offline transmission indicator=1, and transmits an AAI-RNG-REQ message including uplink data to the BS 200-2.

Upon receiving the AAI-RNG-REQ messages from the M2M terminals 100-1, 100-2, and 100-3, the BSs 200-1 and 200-2 may recognize that the M2M terminals 100-1, 100-2, and 100-3 intend to transmit uplink data in a state in which they are not connected to a network, judging from that the offline transmission indicator included the AAI-RNG-REQ message is set to be 1 (offline transmission indicator=1). Accordingly, the BSs 200-1 and 200-2 transfer the group identifiers and uplink data included in the AAI-RNG-REQ messages received from the M2M terminals 100-1, 100-2, and 100-3, respectively.

The ASN gateway 300 determines that the M2M terminal 100-1 is an M2M terminal that belongs to a terminal group for receiving the vehicle location tracking service, judging from that the group identifier received from the M2M terminal 100-1 is set to be 1, and transfers the corresponding group identifier and the uplink data to the service providing server 400-1 providing the vehicle location tracking service.

Also, the ASN gateway 300 determines that the M2M terminals 100-2 and 100-3 are M2M terminals that belong to a terminal group receiving a monitoring service, judging from that the group identifiers received from the M2M terminals 100-2 and 100-3 are set to be 2, and transfers the corresponding group identifiers and the uplink data to the service providing server 400-2 providing the monitoring service.

The service providing server 400-1 decrypts the uplink data received from the M2M terminal 100-1 by using an encryption key corresponding to the group identifier=1 to obtain raw data. And, the service providing server 400-1 transmits the terminal identifier of the M2M terminal 100-1 included in the raw data to the BS 200-1. Upon receiving the terminal identifier from the service providing server 400-1, the BS 200-1 identifies the M2M terminal 100-1 and transmits an AAI-RNG-RSP message indicating that the uplink data has been successfully received, to the M2M terminal 100-1.

Similarly, the service providing server 400-2 decrypts the uplink data received from the M2M terminal 100-2 by using an encryption key corresponding to the group identifier=2, and obtains raw data. And, the service providing server 400-2 transmits the terminal identifier of the M2M terminal 100-2 included in the raw data to the BS 200-1. Then, the BS 200-1 identifies the M2M terminal 100-2 by using the terminal identifier received from the service providing server 400-2 and transmits an AAI-RNG-RSP message indicating that the uplink data has been successfully received, to the M2M terminal 100-2.

Also, the service providing server 400-2 decrypts the uplink data received from the M2M terminal 100-3 by using an encryption key corresponding to the group identifier=2 to obtain raw data. And then, the service providing server 400-2 transmits the terminal identifier of the M2M terminal 100-3 included in the raw data to the BS 200-2. The BS 200-2 identifies the M2M terminal 100-3 by using the terminal identifier received from the service providing server 400-2, and transmits an AAI-RNG-RSP message indicating that the uplink data has been successfully received, to the M2M terminal 100-3.

Figure 4:
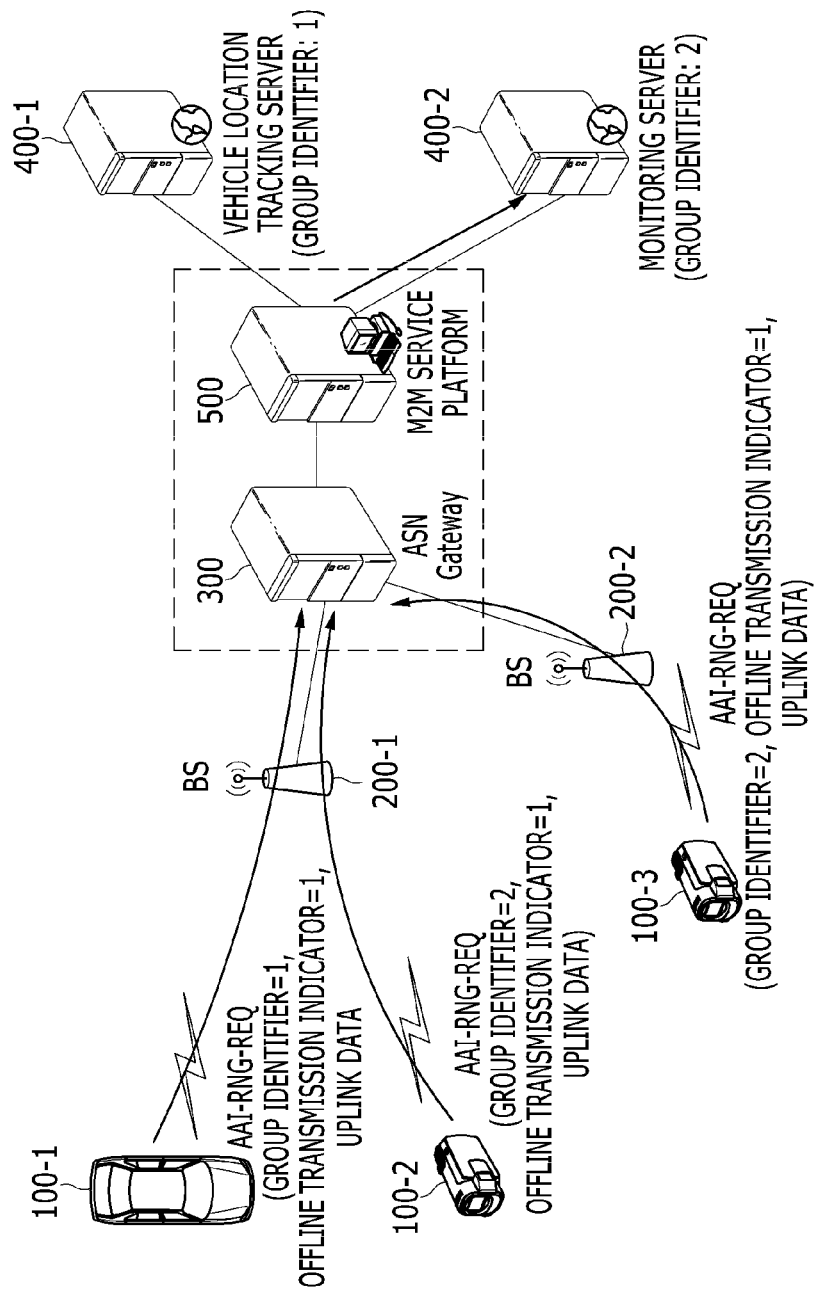
FIG. 4 is a view showing a network environment supporting an uplink data transmission procedure of an M2M terminal according to another embodiment of the present invention.

FIG. 4 is a view showing a network environment supporting an uplink data transmission procedure of an M2M terminal according to another embodiment of the present invention.

With reference to FIG. 4, a network environment supporting an uplink data transmission procedure of an M2M terminal includes one or more M2M terminals 100-1, 100-2, and 100-2, one or more base stations 200-1 and 200-2, the gateway 300, an M2M service platform 500, and one or more service providing servers 400-1 and 400-2.

The network environment illustrated in FIG. 4 is similar to the network environment illustrated in FIG. 3, except for the M2M service platform 500. Thus, a repeated description thereof will be omitted.

The M2M service platform 500 is a platform administering an M2M service. Unlike the network environment illustrated in FIG. 3, the M2M service platform 500 processes data transmitted from the M2M terminals 100-1, 100-2, and 100-3.

Namely, the BSs 200-1 and 200-2 may recognize that the M2M terminals 100-1, 100-2, and 100-3 intend to transmit uplink data in a state in which they are not connected to a network, judging from the offline transmission indicator included the AAI-RNG-REQ messages transmitted from the M2M terminals 100-1, 100-2, and 100-3.

Accordingly, the BSs 200-1 and 200-2 transfers group identifiers and uplink data included in the AAI-RNG-REQ messages transmitted from the M2M terminals 100-1, 100-2, and 100-3 to the M2M service platform 500 through the ASN gateway 300. Like the ASN gateway 300 illustrated in FIG. 3, the M2M service platform 500 transfers the group identifiers and the uplink data to the appropriate service providing servers 400-1 and 400-2 based on the received group identifiers.

In this manner, the ASN gateway 300 or the M2M service platform 500 transfers the uplink data to the appropriate service providing servers 400-1 and 400-2 by using the group identifiers, and the service providing servers 400-1 and 400-2 may identify terminals by using the group identifiers and information included in the uplink data. Thus, even when the M2M terminals enter an idle mode, the ASN gateway 300 or the M2M service platform 500 is not required to separately keep individual identifiers of the M2M terminals in storage. Therefore, the size of the memory of the ASN gateway 300 or the M2M service platform 500 can be reduced and product unit cost can be reduced.

In the present disclosure, the case in which each subscriber operates a single service providing server and a group identifier is allocated to each service providing server is illustrated as an example. However, the technical concept of the present invention is not limited thereto. Namely, each subscriber may operate two or more service providing servers to provide the same service and a group identifier may be allocated to each service providing server. Two or more subscribers may operate a single service providing server and a group identifier may be allocated to each subscriber. Besides, various embodiments may be implemented.

Figure 5:
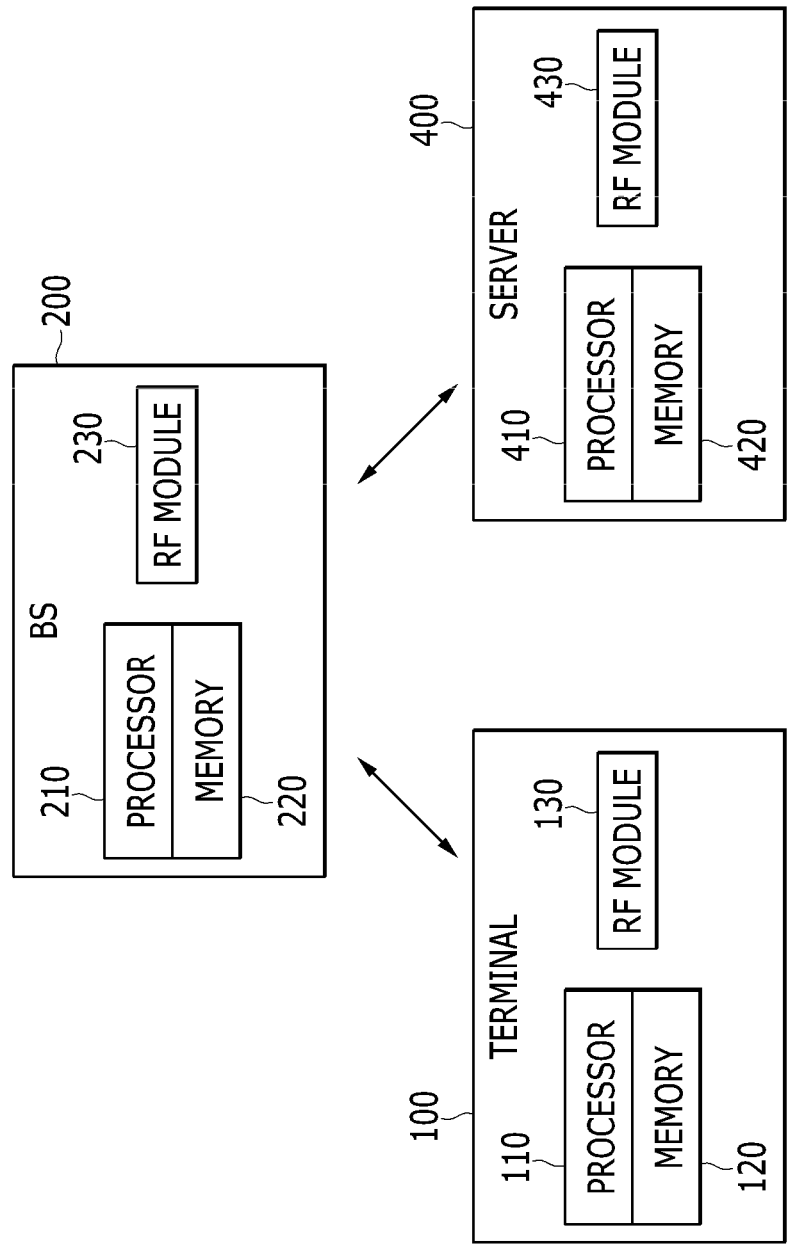
FIG. 5 is a view showing a terminal, a base station, and a server applicable to an embodiment of the present invention.

FIG. 5 is a view showing a terminal, a base station, and a server applicable to an embodiment of the present invention.

With reference to FIG. 5, a mobile communication system includes a terminal 100, a BS 200, and a service providing server 400. The terminal 100, the BS 200, and the service providing server 400 includes processors 100, 210, and 410, memories 120, 220, and 420, and radio frequency (RF) units 130, 230, and 430, respectively. The processors 110, 210, and 410 may be configured to implement the procedures and/or methods proposed by the present invention. The memories 120, 220, and 420 are connected to the processors 110, 210, and 410, and store various types of information in relation to the operations of the processors 110, 210, and 410, respectively. The RF units 130, 230, and 430 are connected to the processors 110, 210, and 410, and transmit and/or receive a radio signal. The BS 200 and/or the terminal 100 may have a single antenna or multiple antennas.

According to an embodiment of the present invention, an M2M terminal in an idle mode may transmit uplink data without having to perform a network reentry (or re-access) procedure. Thus, power consumption of the M2M terminal can be reduced. Also, in the aspect of a network, since a data can be distributed based on services, fabrication unit cost of a gateway or a platform providing an M2M service can be lowered.

The embodiments of the present invention may not necessarily be implemented only through the foregoing devices and methods but may also be implemented through a program for realizing functions corresponding to the configurations of the embodiments of the present invention, a recording medium including the program, or the like.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting uplink data by a terminal in a mobile communication system, the method comprising:

upon detecting that the uplink data are generated in an idle mode by the terminal for transmission via a base station to a service providing server, transmitting a ranging request message including a group identifier allocated by the base station to a terminal group to which the terminal belongs, all terminals in the terminal group being serviceable by the service providing server, an offline transmission indicator indicating transmission of the uplink data in a state in which the terminal is offline, and the uplink data encrypted by an encryption key corresponding to the group identifier, to the base station; and receiving a ranging response message, which is generated by the base station after confirming that the uplink data has been successfully transmitted to the service providing server and includes a terminal identifier of the terminal, from the base station.

2. The method of claim 1, wherein the uplink data includes terminal identifier information as a terminal-specific identifier allocated from an upper layer.

3. The method of claim 1, wherein the ranging request message is transmitted through uplink resource allocated after the terminal transmits a ranging code to the base station.

4. A method for receiving uplink data by a base station in a mobile communication system, the method comprising:
   allocating a group identifier to a terminal during idle mode entry of the terminal, the group identifier identifying a terminal group, all terminal of which being serviceable by a service providing server;
   receiving a ranging request message including
      the group identifier allocated,
      an offline transmission indicator indicating transmission of the uplink data in a state in which the terminal is not connected to a network, and
      the uplink data encrypted by an encryption key corresponding to the group identifier, the uplink data being generated by the terminal for transmission via the base station to the service providing server;
   recognizing that the terminal intends to transmit the uplink data in a state in which the terminal is not connected to a network, through the offline transmission indicator;
   transferring the group identifier and the uplink data to the service providing server corresponding to the group identifier;
   receiving a terminal identifier specific to the terminal from the service providing server; and
   transmitting a ranging response message, after confirming that the uplink data has been successfully transmitted to the service providing server, to the terminal using the terminal identifier to thereby inform the terminal of the successful transmission of the uplink data.

5. The method of claim 4, wherein the terminal identifier is included in the uplink data, and the uplink data is decrypted by the encryption key corresponding to the group identifier.

6. The method of claim 4, wherein the ranging response message is encrypted by an encryption key corresponding to the terminal identifier and transmitted.

7. The method of claim 4, further comprising:
   receiving a ranging code from the terminal in an idle mode;
   interpreting the ranging code; and
   when the ranging code is normally interpreted, allocating uplink resource through which the ranging request message is transmitted.

8. A method for identifying a terminal by a service providing server in a mobile communication system, the method comprising:
   receiving, by the service providing server, a group identifier allocated to a terminal group to which the terminal belongs, and uplink data encrypted by an encryption key corresponding to the group identifier, from a base station that forwards the encrypted uplink data, without decryption, from the terminal to the service providing server, all terminals in the terminal group being serviceable by the service providing server;
   decrypting the uplink data by using the encryption key;
   obtaining a terminal identifier specific to the terminal from the decrypted uplink data; and
   transmitting the terminal identifier to the base station.

9. The method of claim 8, wherein the terminal identifier is associated with an entity providing a predetermined M2M service.

10. A terminal used in a mobile communication system, the terminal comprising:
   a radio frequency (RF) unit; and
   a processor configured
      to transmit to a base station, when uplink data are generated in an idle mode by the terminal for transmission via the base station to a service providing server, a ranging request message including
         a group identifier allocated by the base station to a terminal group to which the terminal belongs, all terminals in the terminal group being serviceable by the service providing server,
         an offline transmission indicator indicating transmission of the uplink data in a state in which the terminal is not connected to a network, and
         the uplink data encrypted by an encryption key corresponding to the group identifier, and
      to receive a ranging response message, which is generated by the base station after confirming that the uplink data has been successfully transmitted to the service providing server and includes a terminal identifier of the terminal, from the base station.

* * * * *